US011220168B2

(12) United States Patent
Mepham

(10) Patent No.: US 11,220,168 B2
(45) Date of Patent: Jan. 11, 2022

(54) AXLE ASSEMBLY FOR LOW FLOOR VEHICLE

(71) Applicant: ALLISON TRANSMISSION, INC., Indianapolis, IN (US)

(72) Inventor: Shaun Mepham, Clarkston, MI (US)

(73) Assignee: ALLISON TRANSMISSION, INC., Indianapolis, IN (US)

(*) Notice: Subject to any disclaimer, the term of this patent is extended or adjusted under 35 U.S.C. 154(b) by 0 days.

(21) Appl. No.: 16/805,104

(22) Filed: Feb. 28, 2020

(65) Prior Publication Data
US 2020/0276895 A1 Sep. 3, 2020

Related U.S. Application Data

(60) Provisional application No. 62/812,039, filed on Feb. 28, 2019.

(51) Int. Cl.
B60K 1/02 (2006.01)
B60K 17/12 (2006.01)

(52) U.S. Cl.
CPC .............. B60K 1/02 (2013.01); B60K 17/12 (2013.01); B60L 2240/423 (2013.01)

(58) Field of Classification Search
None
See application file for complete search history.

(56) References Cited

U.S. PATENT DOCUMENTS

| 2,047,050 | A | * | 7/1936 | Armington | B60L 50/30 |
| | | | | | 475/263 |
| 3,862,667 | A | * | 1/1975 | Wolansky | B60K 17/043 |
| | | | | | 180/233 |
| 5,947,855 | A | * | 9/1999 | Weiss | B60K 6/36 |
| | | | | | 475/5 |
| 6,964,317 | B2 | | 11/2005 | Groves et al. | |
| 7,048,087 | B2 | * | 5/2006 | Brill | B60B 35/002 |
| | | | | | 180/371 |
| 9,283,837 | B1 | | 3/2016 | Rawlinson | |
| 9,302,723 | B1 | | 4/2016 | Pollitzer et al. | |
| 9,630,482 | B2 | * | 4/2017 | Raymond | B60K 7/0007 |
| 10,800,254 | B2 | * | 10/2020 | Remboski | B60K 6/445 |
| 2003/0111280 | A1 | * | 6/2003 | Platner | B60K 1/02 |
| | | | | | 180/65.6 |
| 2004/0200660 | A1 | * | 10/2004 | Szalai | B60K 17/043 |
| | | | | | 180/370 |
| 2005/0045412 | A1 | | 3/2005 | Brill | |

(Continued)

FOREIGN PATENT DOCUMENTS

CN 107284214 A 10/2017
DE 29800582 U1 4/1998

(Continued)

OTHER PUBLICATIONS

International Search Report and Written Opinion for Application No. PCT/US2020/020428, dated Jun. 8, 2020, 13 pages.

Primary Examiner — Dirk Wright
(74) Attorney, Agent, or Firm — Barnes & Thornburg LLP

(57) ABSTRACT

An electric axle assembly includes a suspension frame and drive assemblies coupled to opposing sides of the suspension frame. The electric axle assembly engages with wheels of a vehicle for rotating the wheels to move the vehicle along a ground surface. A drive unit transfers motive force to the wheels through one or more gearsets and axle shafts.

21 Claims, 8 Drawing Sheets

(56) References Cited

U.S. PATENT DOCUMENTS

| | | | |
|---|---|---|---|
| 2015/0096823 A1 | 4/2015 | Raymond | |
| 2019/0120357 A1* | 4/2019 | Han | F16H 37/082 |
| 2020/0180426 A1* | 6/2020 | Chopra | B60K 7/0007 |

FOREIGN PATENT DOCUMENTS

| | | | |
|---|---|---|---|
| EP | 1266784 A1 | 12/2002 | |
| EP | 1503481 A2 | 2/2005 | |
| WO | 2019014479 A1 | 1/2019 | |
| WO | WO-2019217861 A1 * | 11/2019 | B60K 7/0007 |

* cited by examiner

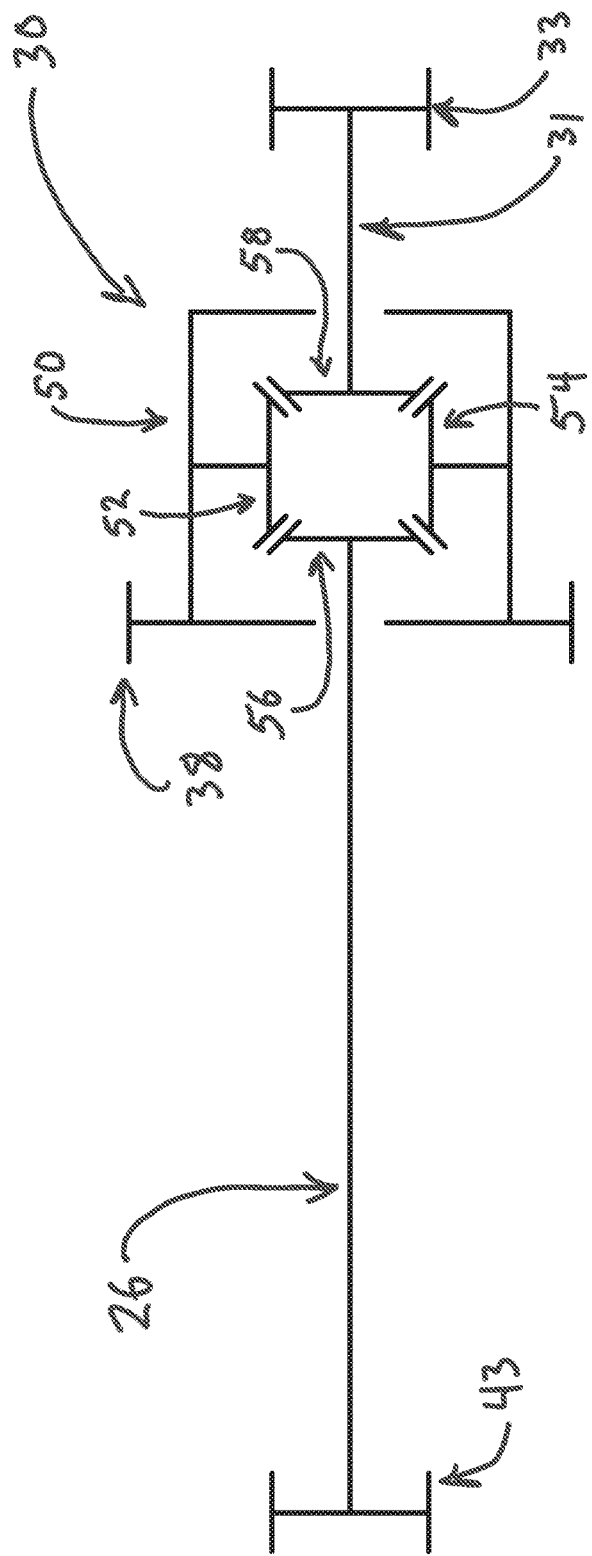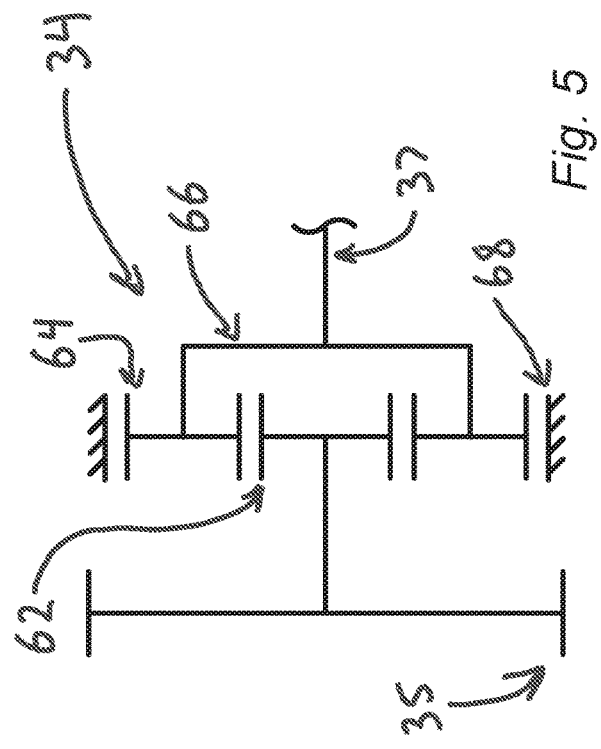

AXLE ASSEMBLY FOR LOW FLOOR VEHICLE

CROSS-REFERENCE TO RELATED U.S. PATENT APPLICATION

This application claims the benefit of priority to U.S. Provisional Application No. 62/812,039, filed Feb. 28, 2019, the disclosure of which is incorporated herein by reference in its entirety.

TECHNICAL FIELD

The present disclosure relates generally to axle assemblies for vehicles, and more particularly, to an electric axle assembly for a vehicle.

BACKGROUND

In order to aid ingress and egress, it is desirable for a motor vehicle to have a floor that is as low to the ground as possible. Busses and people carriers, commonly called low floor vehicles, are examples of vehicles that benefit from a low floor height. By minimizing the floor height, a step at a door of the vehicle may be eliminated, which in turn allows easier ingress and egress for vehicle passengers. Elimination of steps is especially beneficial to disabled passengers, and passengers carrying items, such as strollers. Increasingly, manufacturers have turned to electric and hybrid propulsion systems for low floor vehicles for increased performance and efficiency. In order to have the floor of the vehicle as low as possible, the drivetrain components are relocated so as to reduce intrusions into the vehicle floor.

SUMMARY

According to an aspect of the present disclosure, an electric axle assembly may include a suspension frame, a first drive assembly and a second drive assembly coupled to opposing sides of the suspension frame, a drive unit, and a drive train. A first wheel hub may be coupled to the first drive assembly and a second wheel hub may be coupled to the second drive assembly. The first and second wheel hubs may be arranged to support wheels for rotation about a first axis.

In illustrative embodiments, the drivetrain may include a first gearset arranged in the first drive assembly, a second gearset arranged in the second drive assembly, and a portal axle extending between the first and second gearsets. The first gearset may be coupled to the first wheel hub and the second gearset may be coupled to the second wheel hub. The portal shaft may be arranged for rotation about a second axis offset from the first axis.

In illustrative embodiments, the drive unit may be arranged in the first drive assembly and may be configured to provide motive force to a differential of the first gearset. The portal shaft may be coupled to the differential. The differential may be configured to transfer motive force to the first wheel hub through the first gearset and to the second wheel hub through the portal shaft and second gearset.

In illustrative embodiments, the first gearset may include the differential, a stub shaft coupled to the differential, a first output gearset coupled to the stub shaft, and a first planetary gearset coupled to the first output gearset and the first wheel hub. The differential may be arranged along the second axis. The second gearset may include a second output gearset coupled to the portal shaft opposite of the differential and a second planetary gearset coupled to the second output gearset and the second wheel hub.

In illustrative embodiments, a bridge of the suspension frame may be offset from the first axis, and the portal shaft may be arranged to substantially align the bridge.

In illustrative embodiments, the differential may include a case, a spider gear coupled to the case for rotation with the case about the second axis, and side gears coupled to the portal shaft and stub shaft, respectively, and engaged with the spider gear.

In illustrative embodiments, the differential may include a case, a pair of planet gears coupled to the case for rotation with the case about the second axis, and side gears coupled to the portal shaft and stub shaft, respectively. The planet gears may be engaged with each other and with respective ones of the side gears.

In illustrative embodiments, the first output gearset may include a pinion gear coupled to the stub shaft and an output gear coupled to the first planetary gearset and engaged with the pinion gear.

In illustrative embodiments, the output gear may be arranged for rotation about the first axis.

In illustrative embodiments, the first planetary gearset may include a sun gear coupled to the output gear for rotation about the first axis, a planet gear arranged radially outward of the sun gear and engaged with the sun gear, a ring gear arranged radially outward of the planet gear and engaged with the planet gear, and a carrier coupled to the planet gear and the first wheel hub. The ring gear may be stationary relative to the first axis.

In illustrative embodiments, the second output gearset may include a pinion gear coupled to the portal shaft and an output gear coupled to the second planetary gearset and engaged with the pinion gear.

In illustrative embodiments, the output gear may be arranged for rotation about the first axis.

In illustrative embodiments, the second planetary gearset may include a sun gear coupled to the output gear for rotation about the first axis, a planet gear arranged radially outward of the sun gear and engaged with the sun gear, a ring gear arranged radially outward of the planet gear and engaged with the planet gear, and a carrier coupled to the planet gear and the second wheel hub. The ring gear may be stationary relative to the first axis.

In illustrative embodiments, the electric axle assembly may further include a drive gear coupled to the differential and arranged to receive motive force from the drive unit.

In illustrative embodiments, the electric axle assembly may further include a transmission. The transmission may include a first input gear and second input gear coupled to a drive gear, a first output gear and a second output gear rotatably mounted on a support shaft coupled to the differential, and a gear selector mounted on the support shaft. The drive gear may be arranged to receive motive force from the drive unit. The first input gear may be engaged with the first output gear and the second input gear may be engaged with the second output gear. The gear selector may be movable along the support shaft and rotatably fixed relative to the support shaft. The gear selector may be configured to selectively engage with the first or second output gear to block rotation of the engaged first or second output gear relative to the support shaft.

In illustrative embodiments, in a first configuration, the gear selector may engage with the first output gear to block rotation of the first output gear relative to the support shaft and allow rotation of the second output gear relative to the support shaft to provide a low ratio of the transmission. In a second configuration, the gear selector may engage with the second output gear to block rotation of the second output gear relative to the support shaft and allow rotation of the first output gear relative to the support shaft to provide a high ratio of the transmission.

In illustrative embodiments, the electric axle assembly may further include an actuator configured to move the gear selector to the first and second configurations.

BRIEF DESCRIPTION OF THE DRAWINGS

The systems and methods described herein are illustrated by way of example and not by way of limitation in the accompanying figures (abbreviated as "Fig." or "Figs." herein). For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 4 is a diagrammatic view of a differential of the electric axle assembly of FIG. 3.

FIG. 5 is a diagrammatic view of a planetary gearset of the electric axle assembly of FIG. 3.

DETAILED DESCRIPTION

Figure 1:
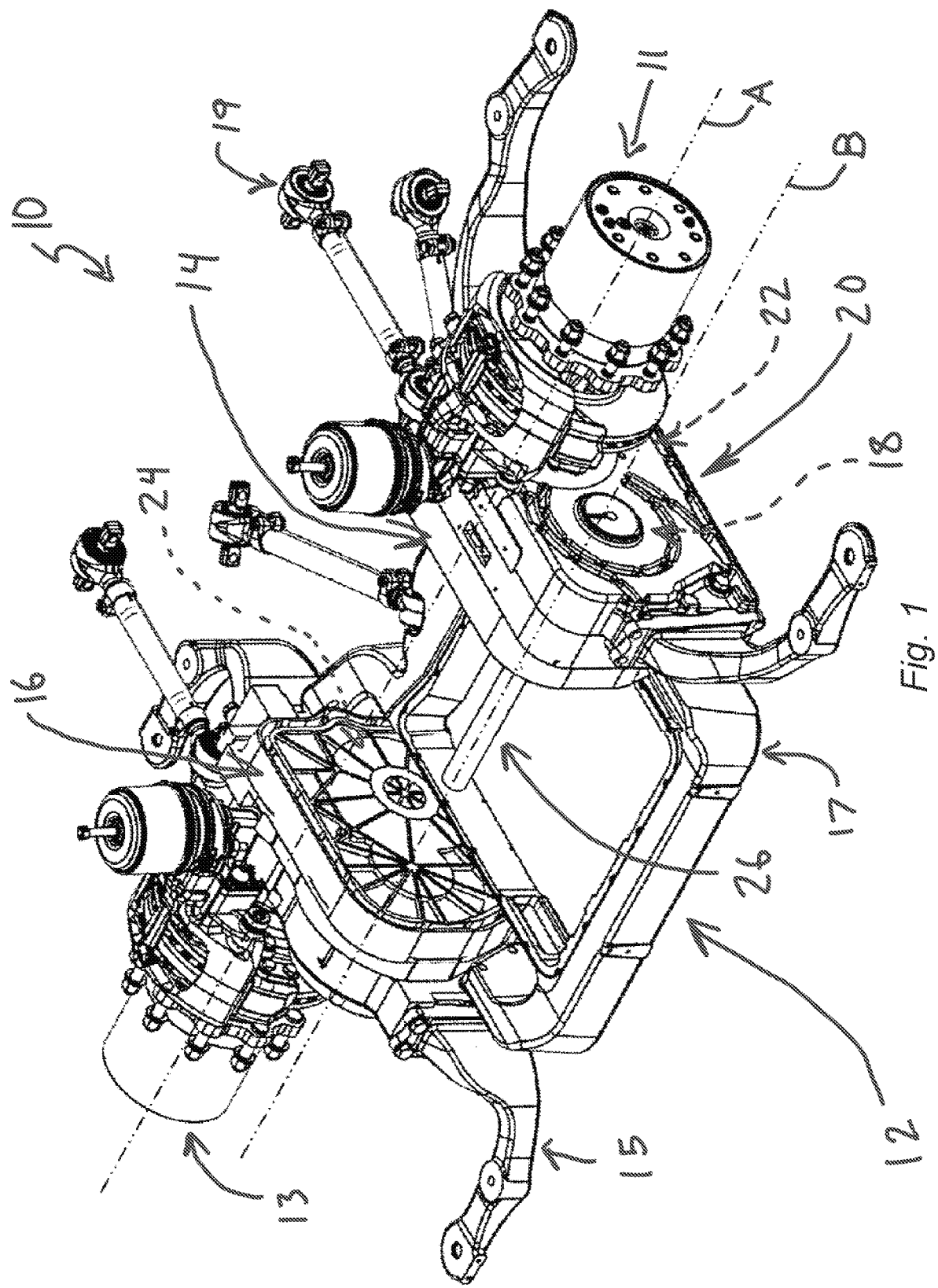
FIG. 1 is a perspective view of an electric axle assembly for a low floor vehicle according to embodiments of the present disclosure.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
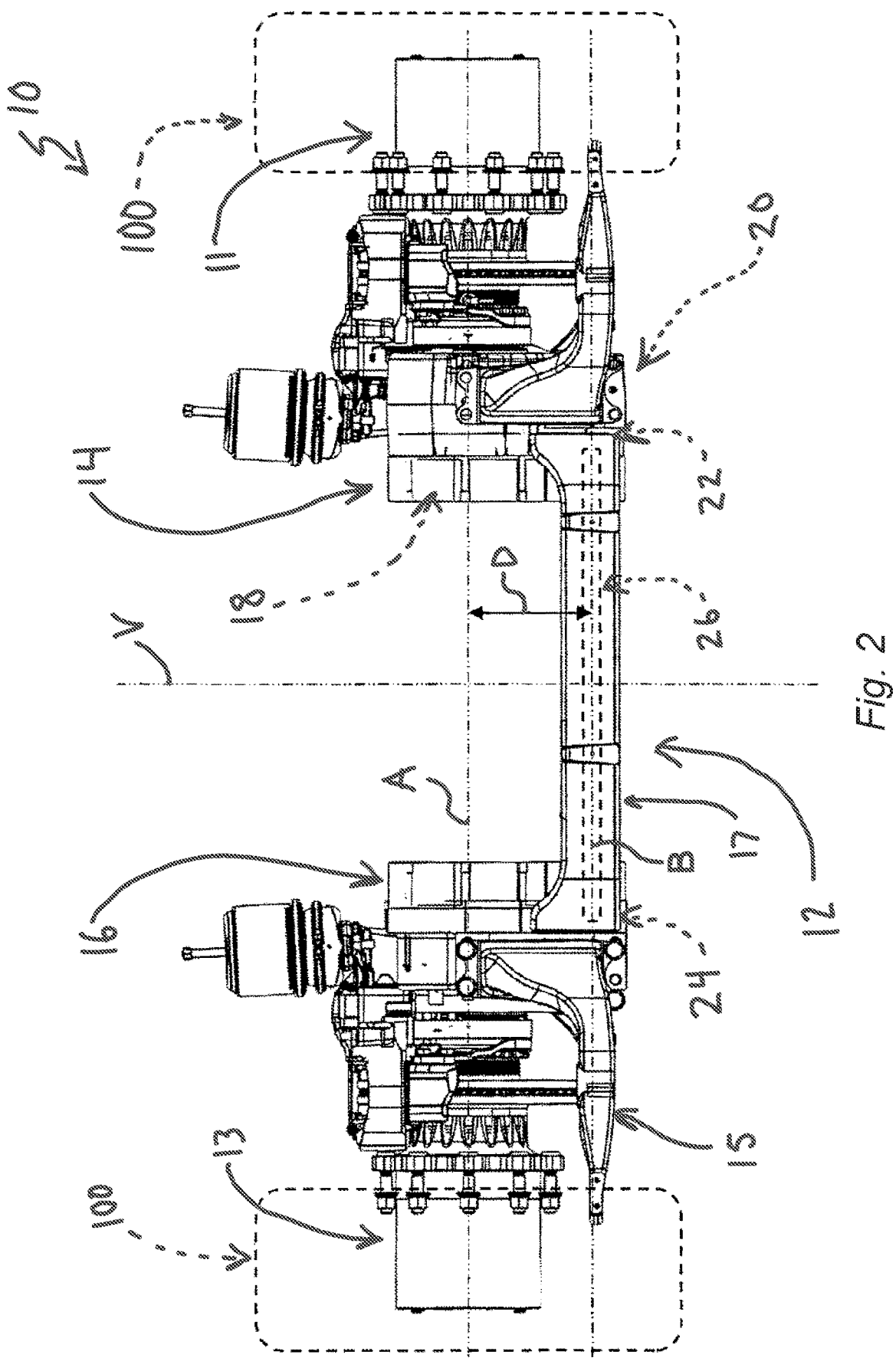
FIG. 2 is a front elevation view of the electric axle assembly shown in FIG. 1.
Figure 3:
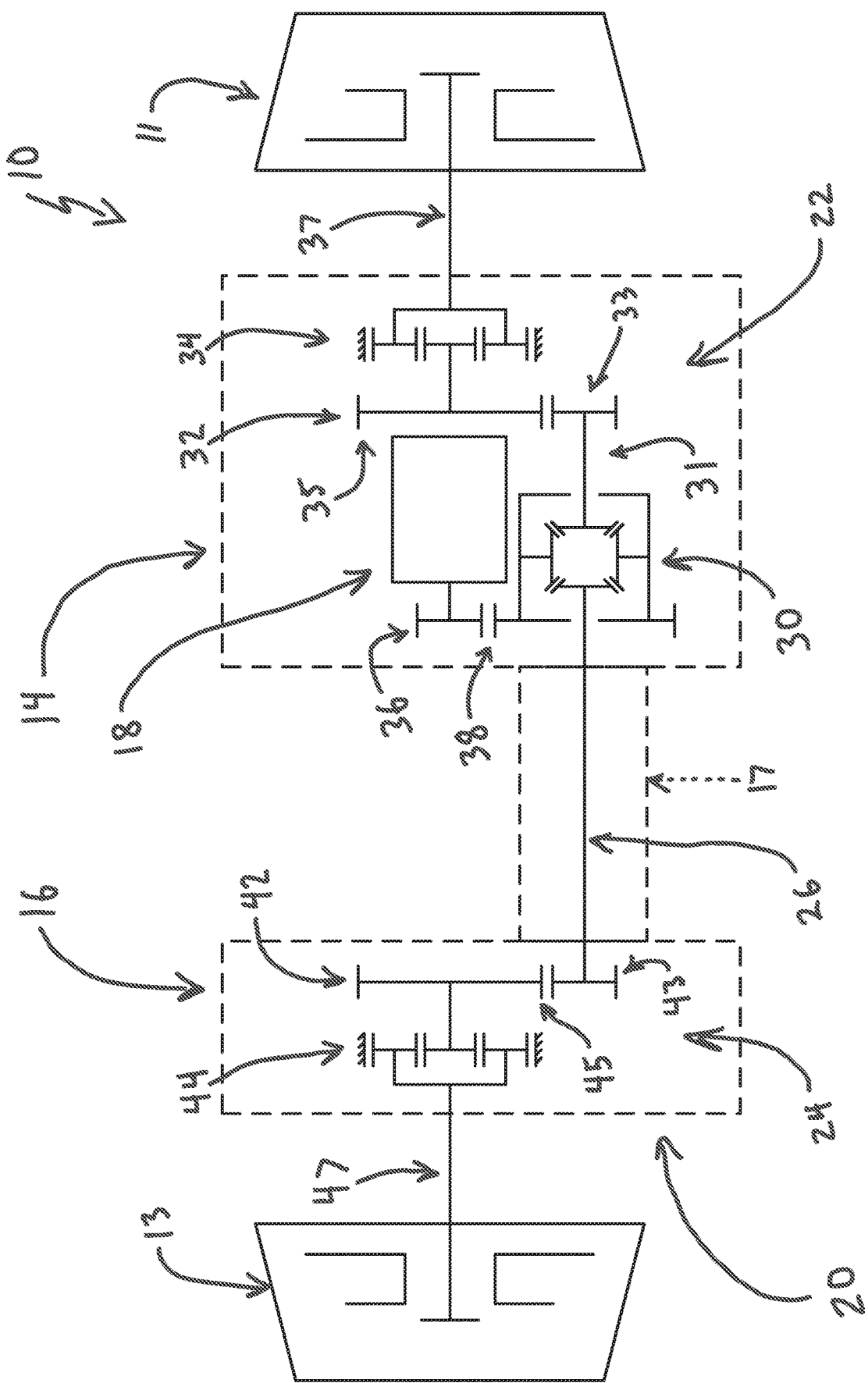
FIG. 3 is a diagrammatic view of the electric axle assembly of FIG. 1.

An illustrative electric axle assembly 10 in accordance with the present disclosure is shown in FIGS. 1-3. The electric axle assembly 10 can be used, for example, in a low floor vehicle, such as a bus, to support the vehicle for travel over the ground and propel the vehicle. The electric axle assembly 10 includes a suspension frame 12 and first and second drive assemblies 14, 16 coupled to opposing sides of the suspension frame 12. The suspension frame 12 includes mounts 15 and a bridge 17. The suspension frame 12 attaches to a vehicle frame (not shown) through the mounts 15 and control arms 19 for supporting the drive assemblies 14, 16 relative to the vehicle frame. In the illustrative embodiment, the mounts 15 are coupled to the drive assemblies 14, 16, and the drive assemblies 14, 16 are coupled to the bridge 17 to support the drive assemblies 14, 16 spaced apart from one another. In some embodiments, the mounts 15 are coupled to the drive assemblies 14, 16, and the bridge 17 (comprising a pair of rails arranged along opposite sides of the drive assemblies 14, 16) are coupled to the mounts 15 to support the drive assemblies 14, 16 spaced apart from one another.

A drive unit 18, such as an electric motor, of the drive assembly 14 provides motive force to a drivetrain 20 for rotating wheels 100 (shown in phantom in FIG. 2) mounted on wheel hubs 11, 13 about an axis A to propel the vehicle along the ground as shown in FIGS. 1 and 2. The wheel hubs 11, 13 allow attachment of the wheels 100 to the drive assemblies 14, 16 for rotation with rotation of the drivetrain 20. The drivetrain 20 includes a first gearset 22 of the first drive assembly 14, a second gearset 24 of the second drive assembly 16, and a portal shaft 26 coupled between the first and second gearsets 22, 24. The portal shaft 26 is arranged for rotation about an axis B. The bridge 17 and portal shaft 26 are offset from the rotation axis A of the wheels 100 in order to decrease the height of the low floor of the vehicle as shown in FIG. 2. It is desirable for a height of the low floor of the vehicle to be as low as possible and a width to be as wide as possible in order to maximize capacity of the vehicle. In the illustrative embodiment, the rotation axis B of the portal shaft 26 is offset from the rotation axis A of the wheels 100 and hubs 11, 13 by a distance D along a vertical axis V. The bridge 17 is also positioned as low as possible, and the portal shaft 26 and bridge 17 can be aligned along a horizontal plane as shown in FIG. 2.

The first gearset 22 is arranged to transfer motive force provided by the drive unit 18 to the wheel hub 11 and the portal shaft 26 as shown in FIGS. 1-3. The portal shaft 26 transfers motive force provided by the first gearset 22 to the second gearset 24, and the second gearset 24 transfers motive force to the wheel hub 13. It should be understood that the arrangement of the drive unit 18 and drivetrain 20 can be inverted (with the drive unit 18 and first gearset 22 in the second drive assembly 16 and the second gearset 24 in the first drive assembly 14) without departing from the present disclosure.

The first gearset 22 includes a differential 30, a first output gearset 32, and a first planetary gearset 34 as shown in FIG. 3. An input gear 36 coupled to the drive unit 18 engages with a drive gear 38 coupled to the differential 30 to transfer motive force delivered by the drive unit 18 to the differential 30. The portal shaft 26 and a stub shaft 31 are coupled to the differential 30 and extend in opposing directions. The first output gearset 32 is coupled to the stub shaft 31, and the stub shaft 31 transfers motive force from the differential 30 to the first output gearset 32 and first planetary gearset 34 for driving rotation of the wheel hub 11 (and attached wheel 100). In the illustrative embodiment, the portal shaft 26, differential 30, and stub shaft 31 are arranged along rotation axis B for rotation around axis B. The first output gearset 32 includes a pinion gear 33 coupled to the stub shaft 31 and an output gear 35 engaged with the pinion gear 33. The output gear 35 is coupled to the planetary gearset 34, and an axle shaft 37 coupled the planetary gearset 34 engages with the wheel hub 11.

The portal shaft 26 transfers motive force from the differential 30 to the second gearset 24 of the second drive assembly 16 for driving rotation of the wheel hub 13 (and attached wheel 100) as shown in FIG. 3. The second gearset 24 includes a second output gearset 42 coupled to the portal shaft 26 opposite from the differential 30 and a second planetary gearset 44 coupled to the second output gearset 42. The second output gearset 42 is similar to the first output gearset 32 and includes a pinion gear 43 coupled to the portal shaft 26 and an output gear 45 engaged with the pinion gear 43. The output gear 45 is coupled to the planetary gearset 44, and an axle shaft 47 coupled the planetary gearset 44 engages with the wheel hub 13.

The differential 30 allows the portal shaft 26 and stub shaft 31 to rotate at different speeds relative to one another as shown in FIGS. 3 and 4. In the illustrative embodiment, the differential 30 is as an "open" differential and includes a case 50, one or more spider gears 52, 54 coupled for rotation with the case 50, and side gears 56, 58 coupled the portal shaft 26 and stub shaft 31, respectively, as shown in FIG. 4. Rotation of the case 50 moves the spider gears 52, 54 around the rotation axis B, and the spider gears 52, 54 engage with the side gears 56, 58 to rotate the portal shaft 26 and stub shaft 31 with rotation of the case 50. The spider gears 52, 54 are also rotatable relative to the case 50 to allow relative differences in rotational speed between the portal shaft 26 and stub shaft 31 to prevent wheel drag during turning of the vehicle, for example.

Each of the planetary gearsets 34, 44 can be similarly arranged, and the following description of the first planetary gearset 34 shown in FIG. 5 is equally applicable to the second planetary gearset 44. The first planetary gearset 34 includes a sun gear 62 coupled to the output gear 35, one or more planet gears 64 coupled to a carrier 66, and a stationary ring gear 68 (relative to the axis A). The ring gear 68 is arranged radially outward of the planet gears 64 (relative to rotation axis A), and the planet gears 64 are arranged radially outward of the sun gear 62. Rotation of the sun gear 62 with the output gear 35 moves the planet gears 64 around the rotation axis A and rotates the carrier 66. The axle shaft 37 is coupled to the carrier 66 for rotation with the carrier 66. In the second planetary gearset 44 of the second gearset 24, the output gear 45 is coupled to the sun gear 62 and the axle shaft 47 is coupled to the carrier 66. As contemplated by the present disclosure, in some embodiments, the differential 30 can be "locking", "torque biasing", "limited slip", or another type of differential.

Providing planetary gearsets 34, 44 in the drive assemblies 14, 16 allows the use of commercial off-the-shelf (COTS) wheel hubs common to smaller low floor vehicles, such as shuttle busses. However, it should be appreciated that, in some embodiments, the first and second planetary gearsets 34, 44 can be incorporated into the wheel hubs 11, 13 with the axle shafts 37, 47 coupled between the output gears 35, 45 and the sun gears 62 of the first and second planetary gearsets 34, 44. In some embodiments, drop boxes can be used to assist in keeping the portal shaft 26 as a low as possible. Exemplary drop boxes are disclosed in U.S. Pat. No. 6,964,317, issued Nov. 15, 2005, the disclosure of which is incorporated by reference herein in its entirety.

In some embodiments, the bridge 17 can also house additional components such as, for example, electrical inverter devices providing power to the drive unit 18, electrical and communication cables, power supply batteries, cooling system components, and/or equipment controllers for operating the electric axle assembly 10. Examples of other axle assemblies for low floor vehicles are shown in International Patent Application Publication Nos. WO2019/014479, published Jan. 17, 2019, and WO2019/217861, published Nov. 14, 2019, the disclosures of which are incorporated by reference herein in their entireties.

Figure 6:
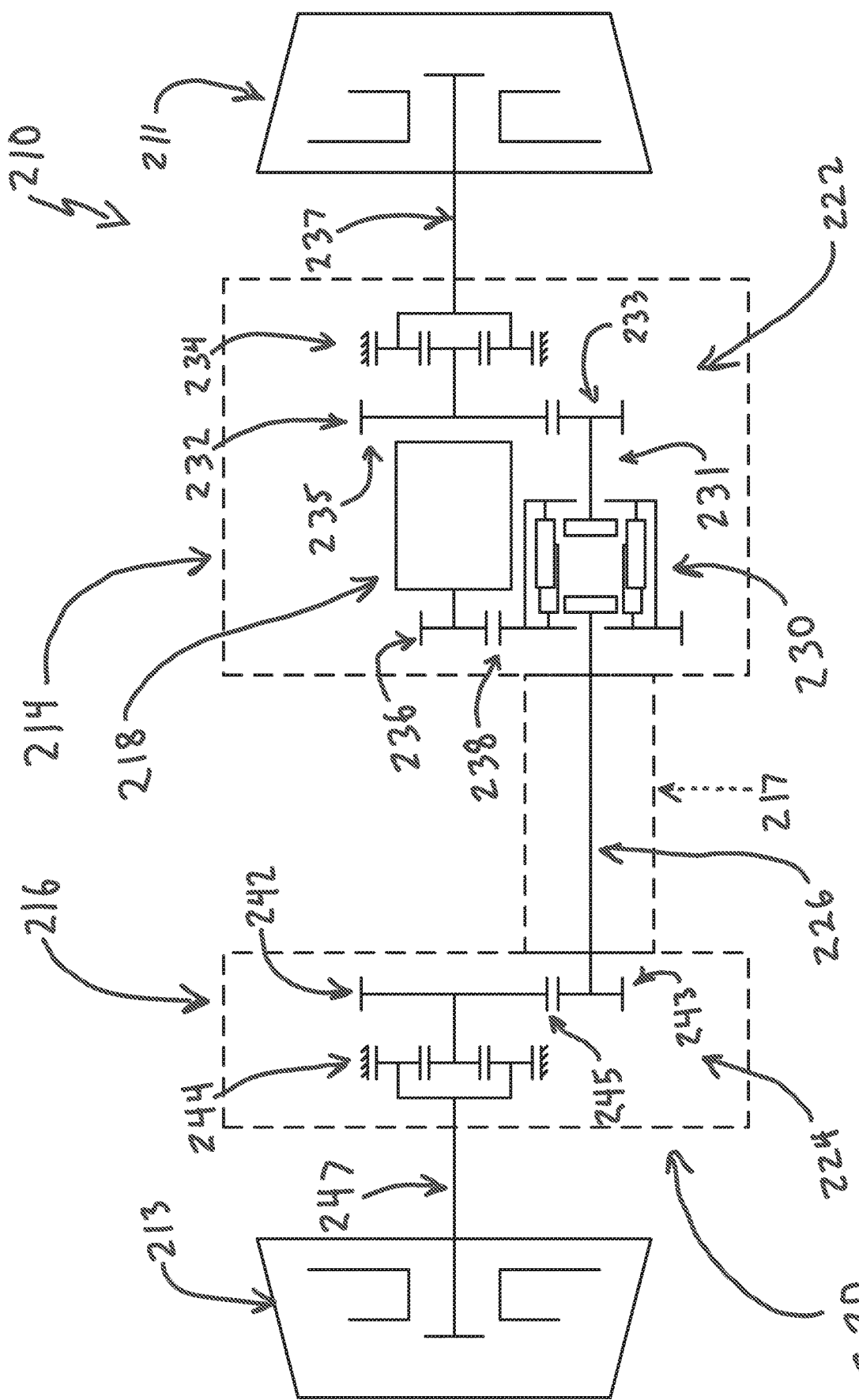
FIG. 6 is a diagrammatic view of another electric axle assembly for a low floor vehicle according to embodiments of the present disclosure.
Figure 7:
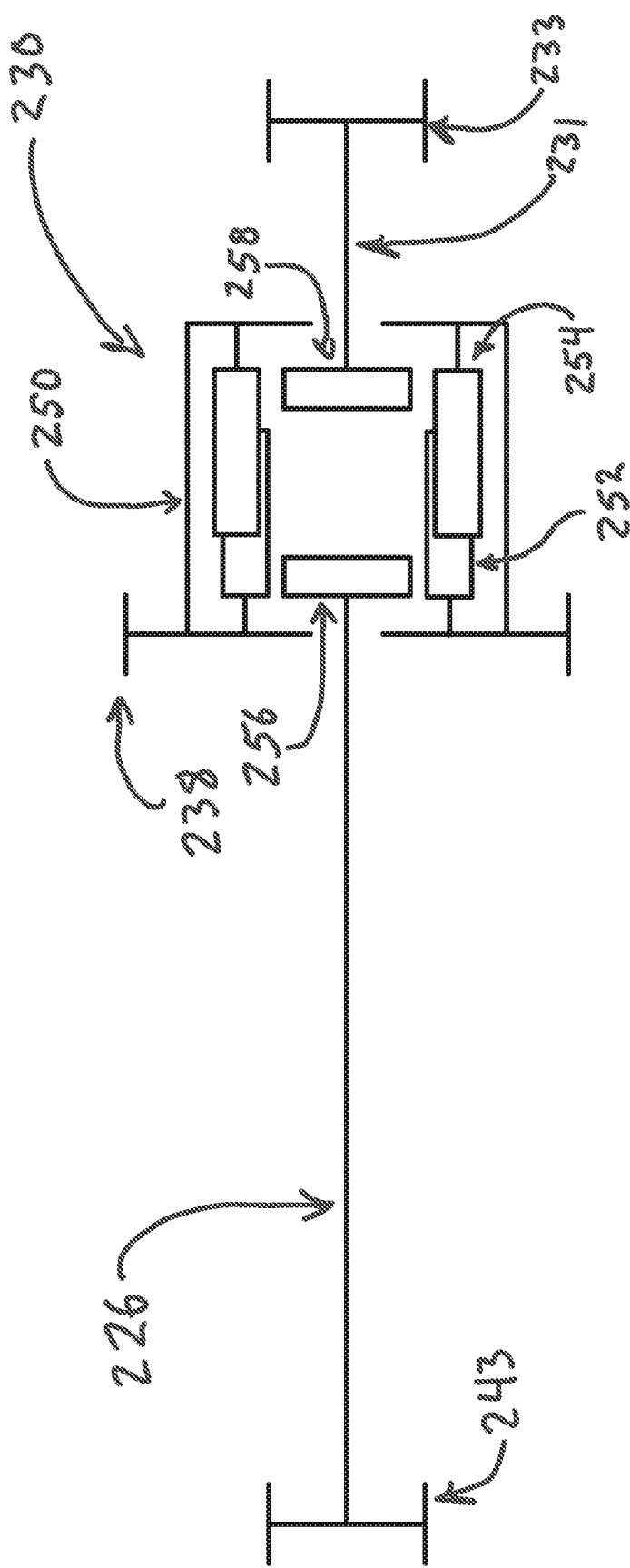
FIG. 7 is a diagrammatic view of a differential of the electric axle assembly of FIG. 6.

Another embodiment of an electric axle assembly 210 in accordance with the present disclosure is shown in FIG. 6. The electric axle assembly 210 is similar to the electric axle assembly 10 of FIGS. 1-5, and like numbers in the 200's are used to identify similar components with the description of the same applying equally. At least one difference between the electric axle assembly 210 and the electric axle assembly 10 is the use of a planetary differential 230 (sometimes called a spur gear differential) in place of the differential 30 as shown in FIGS. 6 and 7. The planetary differential 230 allows the portal shaft 226 and stub shaft 231 to rotate at different speeds relative to one another. In the illustrative embodiment, the planetary differential 230 includes a case 250, one or more pairs of planet gears 252, 254 coupled for rotation with the case 250, and side gears 256, 258 coupled the portal shaft 226 and stub shaft 231, respectively, as shown in FIG. 7. Rotation of the case 250 moves the planet gears 252, 254 around the rotation axis B, and the planet gears 252, 254 engage with each other and with respective ones of the side gears 256, 258 to rotate the portal shaft 226 and stub shaft 231 with rotation of the case 250. The planet gears 252, 254 are also rotatable relative to the case 250 to allow relative differences in rotational speed between the portal shaft 226 and stub shaft 231 to prevent wheel drag during turning of the vehicle, for example.

Figure 8:
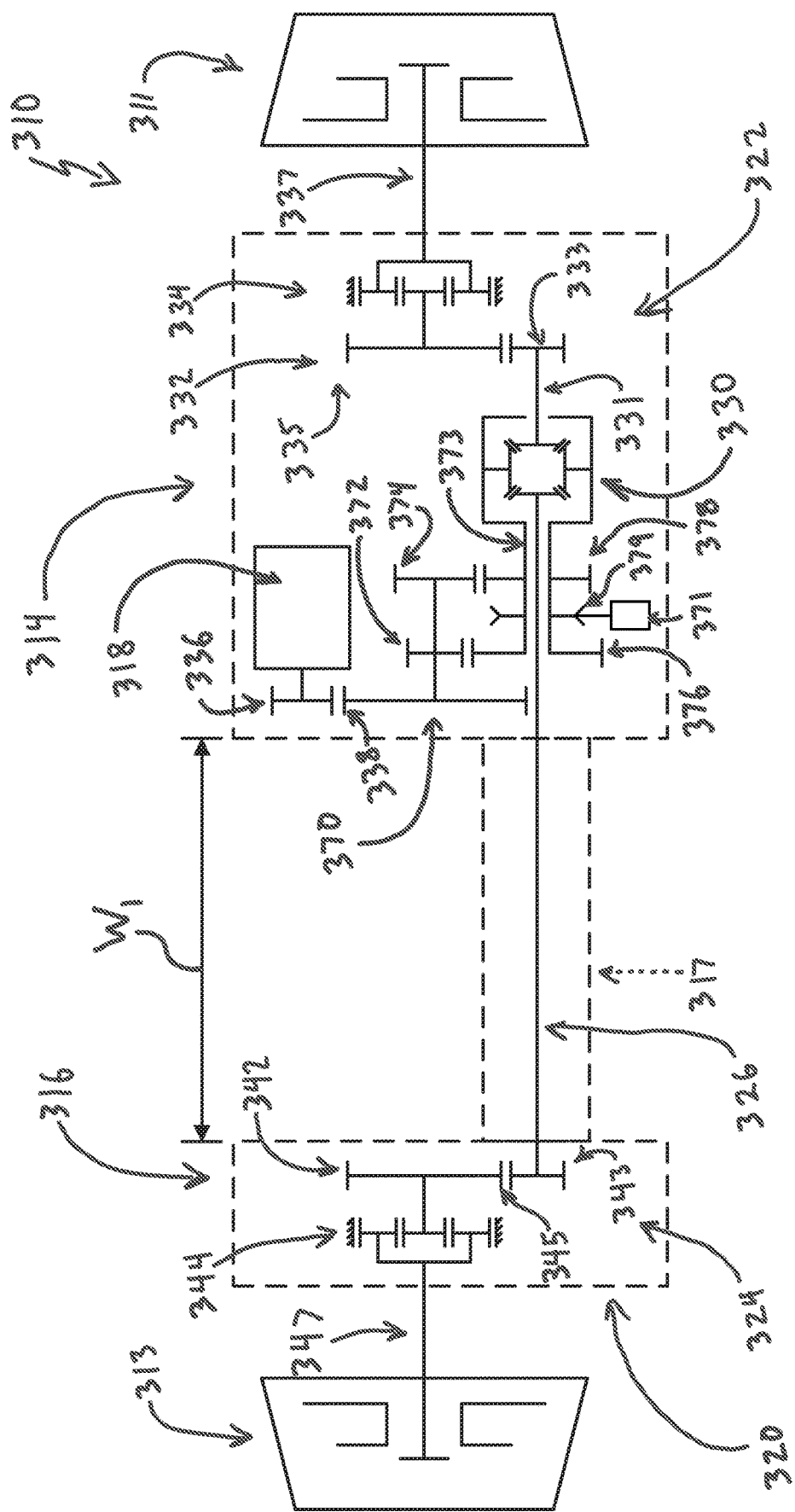
FIG. 8 is a diagrammatic view of another electric axle assembly for a low floor vehicle according to embodiments of the present disclosure.

Another embodiment of an electric axle assembly 310 in accordance with the present disclosure is shown in FIG. 8. The electric axle assembly 310 is similar to the electric axle assembly 10 of FIGS. 1-5, and like numbers in the 300's are used to identify similar components with the description of the same applying equally. At least one difference between the electric axle assembly 310 and the electric axle assembly 10 is the use of a multi-speed transmission 370 in combination with the differential 330 as shown in FIG. 8. In the illustrative embodiment, the transmission 370 is a two-speed transmission and includes gears 372, 374, 376, 378 and a gear selector 379. A first input gear 372 and second input gear 374 are coupled to the drive gear 338 for rotation with the drive gear 338 by the drive unit 318. A first output gear 376 and second output gear 378 are rotatably mounted on a support shaft 373 coupled to the differential 330. The first input gear 372 is engaged with the first output gear 376, and the second input gear 374 is engaged with the second output gear 378. An actuator 371 is coupled to the gear selector 379 to move the gear selector 379 along the support shaft 373 relative to the first and second output gears 376, 378.

The gear selector 379 is shown in a neutral positon between the first and second output gears 376, 378 in FIG. 8 where the gear selector 379 is disengaged from both of the first and second output gears 376, 378 to allow rotation of the first and second output gears 376, 378 around rotation axis B relative to the support shaft 373. The gear selector 379 is rotatably fixed relative to the support shaft 373 and configured to engage with the first and second output gears 376, 378, with movement by the actuator 371, to block rotation of the first and second output gears 376, 378 relative to the support shaft 373. In a first configuration, the gear selector 379 engages with the first output gear 376 to block rotation of the first output gear 376 relative to the support shaft 373 and allow rotation of the second output gear 378 relative to the support shaft 373. In a second configuration, the gear selector 379 engages with the second output gear 378 to block rotation of the second output gear 378 relative to the support shaft 373 and allow rotation of the first output gear 376 relative to the support shaft 373. In some embodiments, the differential 230 can be used in place of the differential 330 with the support shaft 373 being coupled to the differential 230.

The transmission 370 provides multiple, selectable gear ratios for driving rotation of the portal shaft 326 and stub shaft 331 by the drive unit 318 as shown in FIG. 8. For example, with the gear selector 379 in the first configuration, the first input gear 372 and first output gear 376 provide a first gear ratio (e.g., a low ratio) allowing increased torque from the drive unit 318 to be transmitted to the portal shaft 326 and stub shaft 331, at the expense of speed, allowing the vehicle to accelerate more quickly. In a second configuration, the second input gear 374 and second output gear 378 provide a second gear ratio (e.g., a high ratio) allowing increased rotational speed of the portal shaft 326 and stub shaft 331, at the expense of torque, allowing the vehicle to reach a higher velocity.

Figure 9:
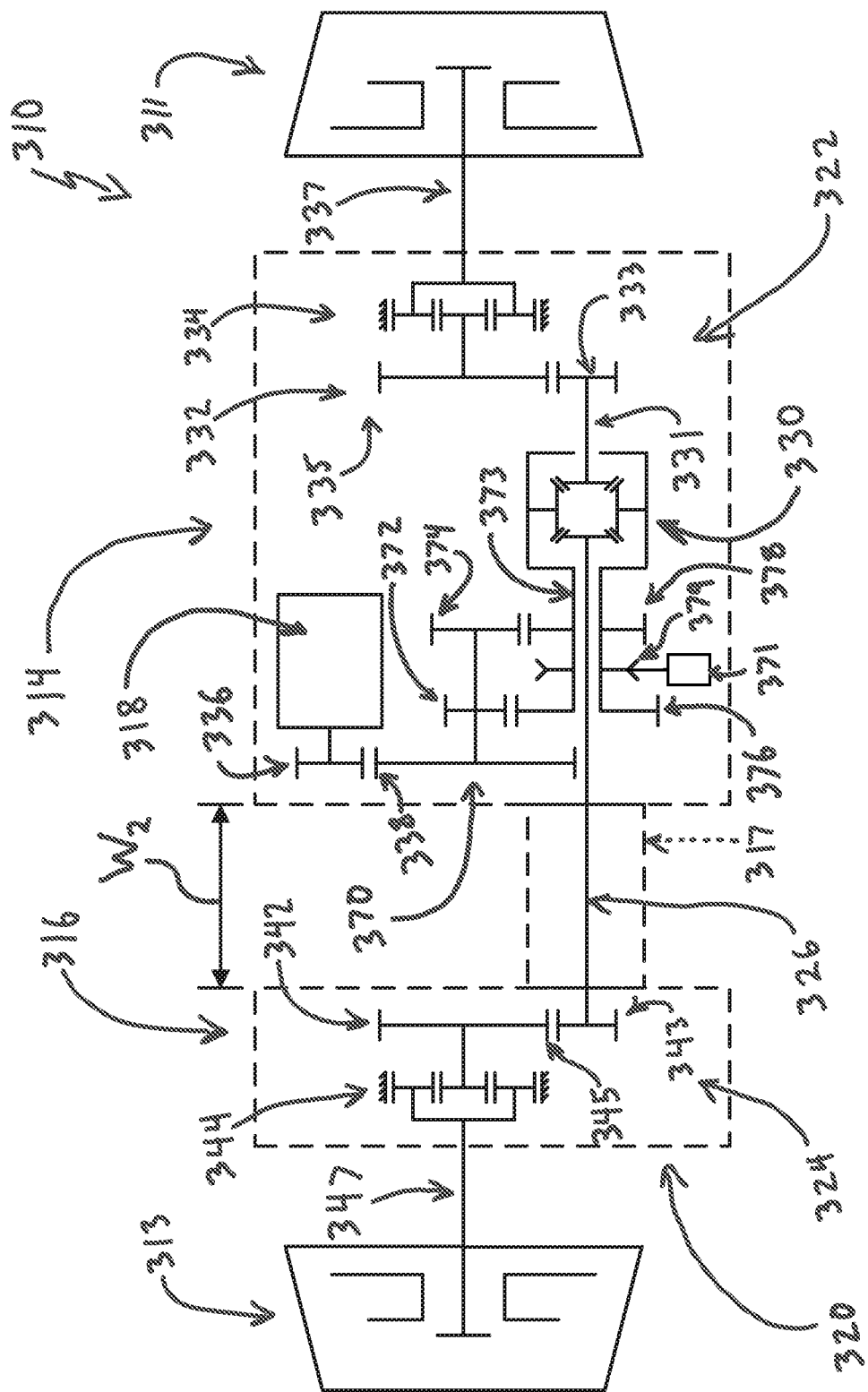
FIG. 9 is a view similar to FIG. 8 showing a bridge of a suspension from of the electric axle assembly having a shortened width.

In some embodiments, a size of the portal shaft 326 and bridge 317 can be adjusted to accommodate different configurations of the low floor in the vehicle as shown in FIGS. 8 and 9. For example, the first and second drive assemblies 314, 316 can be spaced apart by a width $W_1$ in a first configuration as shown in FIG. 8. The first and second drive assemblies 314, 316 can be spaced apart by a width $W_2$ in a first configuration as shown in FIG. 9, with the width $W_2$ being less that the width $W_1$. This is also applicable to electric axle assemblies 10, 210 disclosed herein.

The descriptions herein of the various embodiments of electric axle assemblies may be incorporated by reference with respect to one another.

In illustrative embodiments, electric axle assemblies in accordance with the present disclosure can be arranged for use with a vehicle such as, for example, a bus. Wheels are arranged at opposing ends of the electric axle assemblies to support the vehicle for conveyance along a ground surface. The electric axle assemblies propel the vehicle by transferring motive power to the wheels in contact with the ground surface. The vehicle can include a chassis upon which a body and other equipment may be supported. The chassis can include frame rails; suspension components such as springs, dampers, and trailing arms; and brake components such as air cylinders, brake calipers, brake rotors, brake drums, brake hoses, and the like. The electric axle assemblies can be mounted perpendicular to the frame rails such that the vehicle travels in a direction aligned with the frame rails.

In illustrative embodiments, the electric axle assemblies may be configured for "single-wheel" applications and "dual-wheel" applications. In "single-wheel" applications a single wheel is coupled to each end of the electric axle assembly. Likewise, in "dual-wheel" applications, wheels are arranged in pairs at each end of the electric axle assembly. Vehicles requiring increased payload or towing capacity are one example of a "dual-wheel" application. Vehicles that require a further increased payload/towing capacity may be equipped with two or more electric axle assemblies. Some vehicles may require drive devices other than wheels. For example, crawler tracks or rail wheels may be coupled to the electric axle assembly to propel the vehicle. The electric axle assembly may be mounted to the vehicle in the front and in the rear to realize various drive types such as front-wheel drive, rear-wheel drive, and all/four-wheel drive.

In illustrative embodiments, vehicle performance is optimized when the wheels are in constant contact with the ground. In order to more easily follow the ground, a suspension system can movably couple the electric axle assembly to the frame rails. The suspension system allows the electric axle assembly to move relative to the frame rails and urges the wheels toward the ground when the vehicle encounters imperfections in the ground. The suspension system may include springs and dampers, which absorb movement and improve ride quality; control arms that constrain the movement of the electric axle assembly; and other elements as determined by the application such as steering and kinematic linkages. The electric axle assembly may also be mounted to a vehicle that was not originally equipped with an electric axle assembly. The electric axle assembly can be retrofit to these vehicles to offer an electric driveline upgrade.

In illustrative embodiments, the electric axle assembly may be utilized in both hybrid-electric and fully-electric vehicles. In a fully-electric vehicle, electricity to power the electric axle assembly may be stored in a battery mounted to the chassis. Alternatively, electricity may be supplied from an external power source, such as an overhead wire or third rail system. If the vehicle is configured as a hybrid-electric vehicle, an internal combustion engine may be mounted to the chassis and coupled to a drive unit capable of generating electricity; the electricity may power the electric axle assembly directly, or may be stored in a battery.

In illustrative embodiments, the electric axle assembly can include a drive housing (sometimes called a case) that houses at least one drive unit and drives a gear train (sometimes called a drive train). The drive unit is coupled to the drive housing and engaged with the gear train to transfer power to the wheels. The gear train may include a series of gears and shafts supported for rotation on the electric axle assembly. Typically, bearings are used to reduce friction between rotating components of the gear train. Various bearing types may be used depending on the requirements of the application, for example, journal (plain) bearings, roller bearings, ball bearings, etc. Friction is further reduced through the use of a lubricant, such as oil supplied to contact surfaces between components, such as gear teeth and bearings, to prevent wear and to reduce heat. The electric axle assembly may further include two wheel ends (sometimes called wheel hubs). It should be appreciated that the drive housing and wheel ends may be constructed and coupled in a variety of ways. The electric axle assembly can be configured for use in a low-floor bus and include multiple drive housings, each arranged on opposing sides of the electric axle assembly. The drive housings may be assembled using fasteners and the like.

In the illustrative embodiments, the electric axle assembly includes a drive unit, such as an electric motor, combined with a single speed or a two speed transmission configuration to give both launch performance and velocity performance. In addition, the electric axle assembly includes an axle housing that integrates the electric motor and transmission compactly, supplies cooling for heat dissipation, and transmits vehicle loads to suspension components. The electric axle assembly may also be mounted to a vehicle that was not originally equipped with an electric axle assembly, and can be retrofit to these vehicles to offer an electric driveline upgrade. For example, a low floor bus originally equipped with a traditional axle assembly may utilize the electric axle assembly in place of the traditional axle assembly.

In illustrative embodiments, the electric axle assembly includes a drivetrain (sometimes called a reduction assembly) that is driven by a single drive unit, and an axle housing that encloses the reduction assembly and the single drive unit. The single drive unit drives the wheels (sometimes called wheel assemblies) that are coupled to the electric axle assembly. The reduction assembly includes a first gear set, a second gear set, and portal axle shaft coupled between the first gear set and the second gear set. The first gear set is coupled to a first axle shaft that is orientated along a first axis of rotation. The second gear set is coupled to a second axle shaft that is orientated along a second axis of rotation with said first and second axle shafts extending in opposite directions. The first axle shaft is coupled to a first wheel end (sometimes called a wheel hub) and the second axle shaft is coupled to a second wheel end. The first and second wheel ends can be of any design or configuration, such as COTS wheel ends, and are coupled to corresponding vehicle wheel assemblies. The first axle shaft is orientated coaxial with the second axle shaft such that the first and second axle shafts are orientated along the same axis of rotation. In some embodiments, the first axle shaft may be offset from the second axle shaft such that the first axis of rotation is offset a radial distance from the second axle shaft.

In illustrative embodiments, the axle housing includes a first outer unit (sometimes called a drive assembly), a second outer unit, and a bridge. The first and second outer units are generally illustrated as having somewhat rectangular configurations, but can be of any suitable design or configuration in order to house the associated components discussed herein. The first and second outer units can also have different configurations from one another.

In illustrative embodiments, the first outer unit encloses the single drive unit and the first gear set with the first axle shaft and the portal axle shaft partially disposed within the first outer unit. The second outer unit encloses the second gear set with the second axle shaft and the portal axle shaft partially disposed within the second outer unit. The bridge is coupled between the first outer unit and the second outer unit and encloses a portion of the portal axle shaft extending between the first gear set and the second gear set. In some embodiments, the bridge may also house additional components such as, for example, electrical inverter devices providing power to the drive unit, electrical and communication cables, power supply batteries, and/or equipment controllers for operating the electric axle assembly. The outer units may be arranged at opposite ends of the bridge, and may be spaced laterally from each other relative to the vehicle. Mounts can be used to attach the electric axle assembly to the vehicle and/or suspension arms that may be coupled to the mounts to movably attach the electric axle assembly to the vehicle.

In illustrative embodiments, the portal axle shaft extends along a third axis of rotation that is offset a distance from the first and second axle shafts along a vertical axis. The portal axle shaft extends through or about the bridge of the axle housing between the opposing outer units. Each outer unit has a width, which can be decreased in order to increase the width of the low floor of the vehicle. The bridge may be integrally formed with the outer units or may be coupled to the outer units, such as with fasteners. For example, the bridge may be welded, pressed, or bolted to the outer units.

In illustrative embodiments, the first gear set includes an input gear, a differential gear set, a first output gear set, and a first planetary gear set. The input gear is driven by the single drive unit. The differential gear set is coupled to and driven by the input gear to transfer rotational torque from the single drive unit to the portal axle shaft and to the first output gear set, thereby eliminating the need for a planetary gear set at the wheel end. For example, in some embodiments, the input gear may be coupled to a ring gear of the differential gear set. The first output gear set includes an output shaft that is coupled to and driven by the differential gear set. The output shaft includes a pinion that is coupled to an output gear that drives the first planetary gear set. In one embodiment, the first planetary gear set may include a planetary gear shaft that is coupled to the output gear at one end of the planetary gear shaft, and a sun gear that is coupled to the other end of the planetary gear shaft. In the illustrated embodiment, the first axle shaft is coupled to the first planetary gear set and to the first wheel assembly for transferring rotational torque from the single drive unit to the first wheel assembly via the differential gear set, the first output gear set, and the first planetary gear set.

In illustrative embodiments, the differential gear set may include a planetary differential, with the portal axle shaft and the output shaft coupled to the planetary differential. In other embodiments, the reduction assembly may include portal axle shafts having different shaft lengths to accommodate a width of the bridge, which can be decreased in order to increase the width of the low floor of the vehicle.

In illustrative embodiments, the second gear set includes a second output gear set and a second planetary gear set. The second output gear set is coupled to the portal axle shaft and to the second planetary gear set for transferring rotational torque from the portal axle shaft to the second planetary gear set, thereby eliminating the need for a planetary gear set at the wheel end. For example, in one embodiment, the second output gear set may include a second output gear that is coupled to a pinion of the portal axle shaft. The second planetary gear set may include a second planetary gear shaft that is coupled to the second output gear at one end of the second planetary gear shaft, and a second sun gear that is coupled to the other end of the second planetary gear shaft. The second axle shaft is coupled to the second planetary gear set and the second wheel assembly for transferring rotational torque from the single drive unit to the second wheel assembly via the differential gear set, the portal axle shaft, the second output gear set, and the second planetary gear set.

In illustrative embodiments, the reduction assembly may include one or more drop boxes. For example, the reduction assembly may include a drop box coupled between the portal axle shaft and the second planetary gear set. One or more drop boxes may have a single drop, which can be a gear reduction or can be a 1:1 drop. In some embodiments, the reduction assembly does not incorporate a gear reduction across the portal axle shaft. In another embodiment, the reduction assembly may include one or more drop boxes having different drops, with a first drop box having a single gear drop and a second drop box having a double gear drop. The drop boxes may have the same or a different gear reductions.

In illustrative embodiments, the reduction assembly includes a two speed transmission configuration to give both launch performance and velocity performance. For example, the first gear set may include a speed change mechanism that is coupled between the input gear and the differential gear set and is selectively shiftable between a first ratio and a second ratio to change the rotational torque transferred to the first and second axle shafts. The speed change mechanism includes a reduction gear set that is driven by the input gear and an output gear set that is driven by the reduction gear set. The reduction gear set includes an input reduction gear that is coupled to the input gear, a first reduction gear and a second reduction gear. The output gear set is coupled to the differential gear set and includes and output shaft, a first output gear, and a second output gear. The output shaft is coupled to the differential gear set for transferring rotational torque from the reduction gear set to the differential gear set. The two output gears are each rotatably supported on the output shaft. The first output gear is coupled to the first reduction gear and corresponds to the first ratio of the reduction assembly, and the second output gear is coupled to the second reduction gear and corresponds to the second ratio of the reduction assembly. In the illustrated embodiment, each of the output gears can spin freely on the output shaft such that when the corresponding ratio is not engaged, no torque is transferred between the output shaft and the output gears. In one embodiment, the output shaft is orientated coaxially with the portal axle shaft and may include an inner surface that defines a bore that is sized and shaped to receive the portal axle shaft therethrough.

In illustrative embodiments, a shift mechanism (sometimes called a gear selector) is positioned between the first output gear and the second output gear and is configured to selectively engage the first output gear and the second output gear. Each output gear may include a splined portion engageable with the shift mechanism to rotatably couple the output gears to the output shaft. The shift mechanism may include a shift sleeve, a shift fork, and an actuator. The shift sleeve is coupled to the output shaft such that the shift sleeve and the output shaft rotate at the same speed. The shift fork is operably coupled to the actuator and to the shift sleeve such that movement of the actuator causes the shift fork to slide the shift sleeve along the output shaft. The shift sleeve is selectively engageable with the first output gear and the second output gear to place the reduction assembly in either the first ratio or the second ratio, respectively. The shift sleeve and the output gears include mating engagement features that, when engaged, rotatably couple the output gears to the output shaft. The engagement features may include splines, a dog clutch, or a synchronizer to aid shifting. Additionally, the shift fork and shift sleeve may be movable into a neutral position where neither of the output gears are engaged with the shift sleeve. The actuator may be controlled manually or automatically. The actuator may be responsive to hydraulic pressure, pneumatic pressure, or electronic signals generated by a control module. Alternatively, the actuator may include a mechanical linkage controlled by an operator.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. An electric axle assembly comprising:
 a suspension frame;
 a first drive assembly and a second drive assembly coupled to opposing sides of the suspension frame;
 a first wheel hub coupled to the first drive assembly and a second wheel hub coupled to the second drive assembly, the first and second wheel hubs arranged to support wheels for rotation about a first axis;
 a drive unit arranged in the first drive assembly; and
 a drivetrain comprising:
  a first gearset arranged in the first drive assembly, the first gearset including a differential arranged along the second axis, a stub shaft coupled to the differential, a first output gearset coupled to the stub shaft, and a first planetary gearset coupled to the first output gearset and the first wheel hub;
  a second gearset arranged in the second drive assembly, the second gearset including a second output gearset and a second planetary gearset coupled to the second output gearset and the second wheel hub; and
  a portal shaft extending between the first and second gearsets, the portal shaft coupled to the differential and arranged for rotation about a second axis offset from the first axis;
 wherein the second output gearset is coupled to the portal shaft opposite of the differential, the drive unit is configured to provide motive force to the differential, and the portal shaft is configured to transfer motive force from the differential to the second output gearset.

2. The electric axle assembly of claim 1, wherein a bridge of the suspension frame is offset from the first axis, and wherein the portal shaft is arranged to substantially align with the bridge.

3. The electric axle assembly of claim 1, wherein the differential includes a case, a spider gear coupled to the case for rotation with the case about the second axis, and side gears coupled to the portal shaft and stub shaft, respectively, and engaged with the spider gear.

4. The electric axle assembly of claim 1, wherein the differential includes a case, a pair of planet gears coupled to the case for rotation with the case about the second axis, and side gears coupled to the portal shaft and stub shaft, respectively, and wherein the planet gears are engaged with each other and with respective ones of the side gears.

5. The electric axle assembly of claim 1, wherein the first output gearset includes a pinion gear coupled to the stub shaft and an output gear coupled to the first planetary gearset and engaged with the pinion gear.

6. The electric axle assembly of claim 5, wherein the output gear is arranged for rotation about the first axis.

7. The electric axle assembly of claim 5, wherein the first planetary gearset includes a sun gear coupled to the output gear for rotation about the first axis, a planet gear arranged radially outward of the sun gear and engaged with the sun gear, a ring gear arranged radially outward of the planet gear and engaged with the planet gear, and a carrier coupled to the planet gear and the first wheel hub, and wherein the ring gear is stationary relative to the first axis.

8. The electric axle assembly of claim 1, wherein the second output gearset includes a pinion gear coupled to the portal shaft and an output gear coupled to the second planetary gearset and engaged with the pinion gear.

9. The electric axle assembly of claim 8, wherein the output gear is arranged for rotation about the first axis.

10. The electric axle assembly of claim 8, wherein the second planetary gearset includes a sun gear coupled to the output gear for rotation about the first axis, a planet gear arranged radially outward of the sun gear and engaged with the sun gear, a ring gear arranged radially outward of the planet gear and engaged with the planet gear, and a carrier coupled to the planet gear and the second wheel hub, and wherein the ring gear is stationary relative to the first axis.

11. The electric axle assembly of claim 1, further comprising a drive gear coupled to the differential and arranged to receive motive force from the drive unit.

12. The electric axle assembly of claim 1, further comprising a transmission comprising:
- a first input gear and second input gear coupled to a drive gear, the drive gear arranged to receive motive force from the drive unit;
- a first output gear and a second output gear rotatably mounted on a support shaft coupled to the differential, the first input gear engaged with the first output gear and the second input gear engaged with the second output gear; and
- a gear selector mounted on the support shaft, the gear selector movable along the support shaft and rotatably fixed relative to the support shaft,
- wherein the gear selector is configured to selectively engage with the first or second output gear to block rotation of the engaged first or second output gear relative to the support shaft.

13. The electric axle assembly of claim 12, wherein:
- in a first configuration, the gear selector engages with the first output gear to block rotation of the first output gear relative to the support shaft and allow rotation of the second output gear relative to the support shaft to provide a low ratio of the transmission; and
- in a second configuration, the gear selector engages with the second output gear to block rotation of the second output gear relative to the support shaft and allow rotation of the first output gear relative to the support shaft to provide a high ratio of the transmission.

14. The electric axle assembly of claim 13, further comprising an actuator configured to move the gear selector to the first and second configurations.

15. An electric axle assembly comprising:
- a suspension frame;
- a first drive assembly and a second drive assembly coupled to opposing sides of the suspension frame;
- a first wheel hub coupled to the first drive assembly and a second wheel hub coupled to the second drive assembly, the first and second wheel hubs arranged to support wheels for rotation about a first axis;
- a drive unit arranged in the first drive assembly; and
- a drivetrain comprising:
  - a first gearset arranged in the first drive assembly and coupled to the first wheel hub;
  - a second gearset arranged in the second drive assembly and coupled to the second wheel hub; and
  - a portal shaft arranged for rotation about a second axis offset from the first axis, the portal shaft extending between the first and second gearsets;
- wherein the drive unit is configured to provide motive force to a differential of the first gearset, the portal shaft is coupled to the differential, and the differential is configured to transfer motive force to the first wheel hub through the first gearset and to the second wheel hub through the portal shaft and second gearset.

16. The electric axle assembly of claim 15, wherein a bridge of the suspension frame is offset from the first axis, and wherein the portal shaft is arranged to substantially align the bridge.

17. The electric axle assembly of claim 15, wherein the differential is arranged along the second axis for rotation about the second axis.

18. The electric axle assembly of claim 15, further comprising a drive gear coupled to the differential and arranged to receive motive force from the drive unit.

19. The electric axle assembly of claim 15, further comprising a transmission comprising:
- a first input gear and second input gear coupled to a drive gear, the drive gear arranged to receive motive force from the drive unit;
- a first output gear and a second output gear rotatably mounted on a support shaft coupled to the differential, the first input gear engaged with the first output gear and the second input gear engaged with the second output gear; and
- a gear selector mounted on the support shaft, the gear selector movable along the support shaft and rotatably fixed relative to the support shaft,
- wherein the gear selector is configured to selectively engage with the first or second output gear to block rotation of the engaged first or second output gear relative to the support shaft.

20. The electric axle assembly of claim 19, wherein:
- in a first configuration, the gear selector engages with the first output gear to block rotation of the first output gear relative to the support shaft and allow rotation of the second output gear relative to the support shaft to provide a low ratio of the transmission; and
- in a second configuration, the gear selector engages with the second output gear to block rotation of the second output gear relative to the support shaft and allow rotation of the first output gear relative to the support shaft to provide a high ratio of the transmission.

21. The electric axle assembly of claim 20, further comprising an actuator configured to move the gear selector to the first and second configurations.

* * * * *